United States Patent [19]

Rüther

[11] 4,411,639
[45] Oct. 25, 1983

[54] MULTI-PURPOSE WHEEL PARTICULARLY USEFUL FOR GAMES AND DEMONSTRATIONS

[76] Inventor: Hubert Rüther, Elbring 25, Seevetal 8 bei Hamburg, Fed. Rep. of Germany, D-2105

[21] Appl. No.: 221,466

[22] Filed: Dec. 30, 1980

[30] Foreign Application Priority Data

Feb. 1, 1980 [DE] Fed. Rep. of Germany ....... 3003698

[51] Int. Cl.³ ............................................. A63H 17/26
[52] U.S. Cl. .................................... 474/902; 474/166; 474/197; 474/903; 46/221
[58] Field of Search ............... 474/902, 903, 166, 168, 474/169, 197; 301/6 D, 6 DD, 6 DT, 117, 7, 120; 46/221

[56] References Cited

U.S. PATENT DOCUMENTS

| | | | |
|---|---|---|---|
| 494,168 | 3/1893 | Robinson | 46/221 |
| 2,171,923 | 9/1939 | Fischer | 46/221 |
| 3,486,269 | 12/1969 | Fischer | 46/221 |
| 4,058,344 | 11/1977 | Dyson | 301/7 |
| 4,174,871 | 11/1979 | Brannan | 301/7 |
| 4,299,051 | 11/1981 | Pauly et al. | 46/221 |

FOREIGN PATENT DOCUMENTS 926008 4/1947 France ............................ 46/221

Primary Examiner—John E. Murtagh
Assistant Examiner—Richard E. Chilcot, Jr.
Attorney, Agent, or Firm—Martin A. Farber

[57] ABSTRACT

A wheel comprising a tread, at least a rim provided on an outer side thereof with one half of an axially assemblable claw coupling, a wheel hub including a wheel bushing fixed axially with respect to and fixed for rotation with the rim and including an axle bushing positioned generally within the wheel bushing and fixed axially and rotatable with respect to the rim, and a hub cap provided with the other half of the axially assemblable claw coupling and adapted to be connected for rotation with a wheel axle.

17 Claims, 12 Drawing Figures

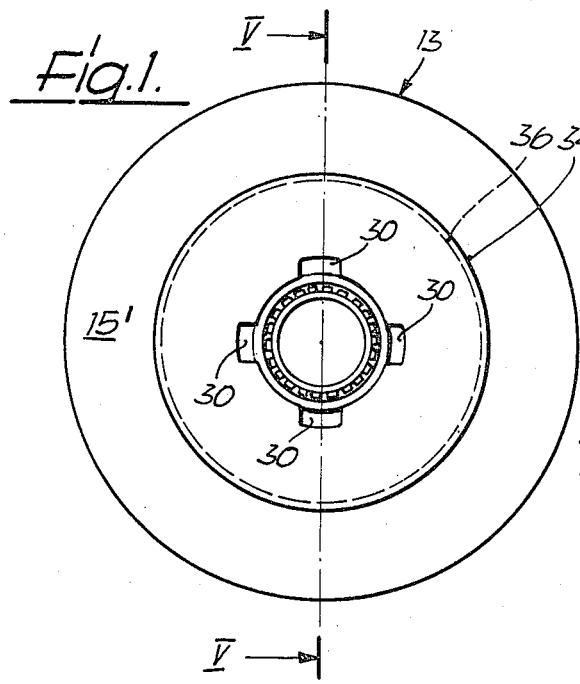
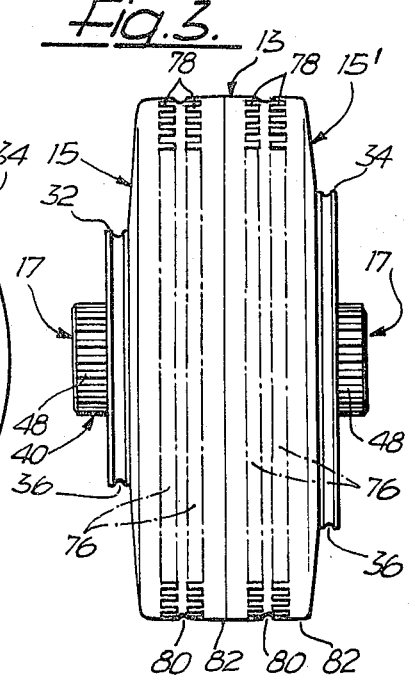
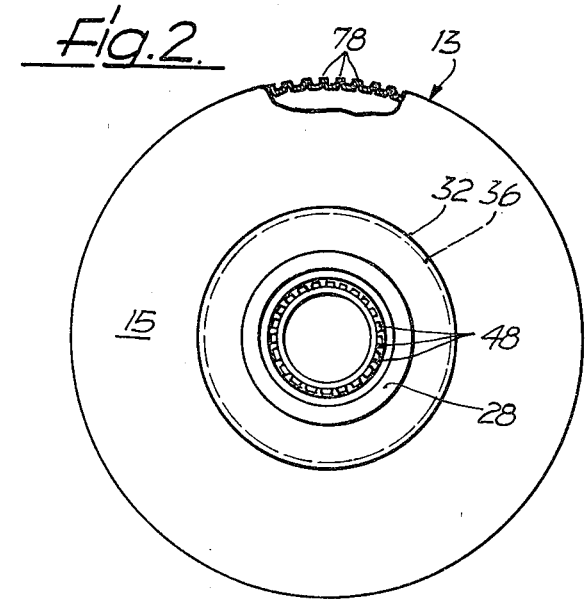
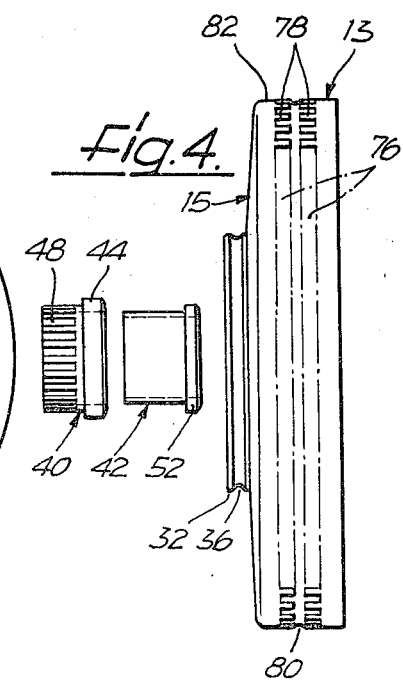

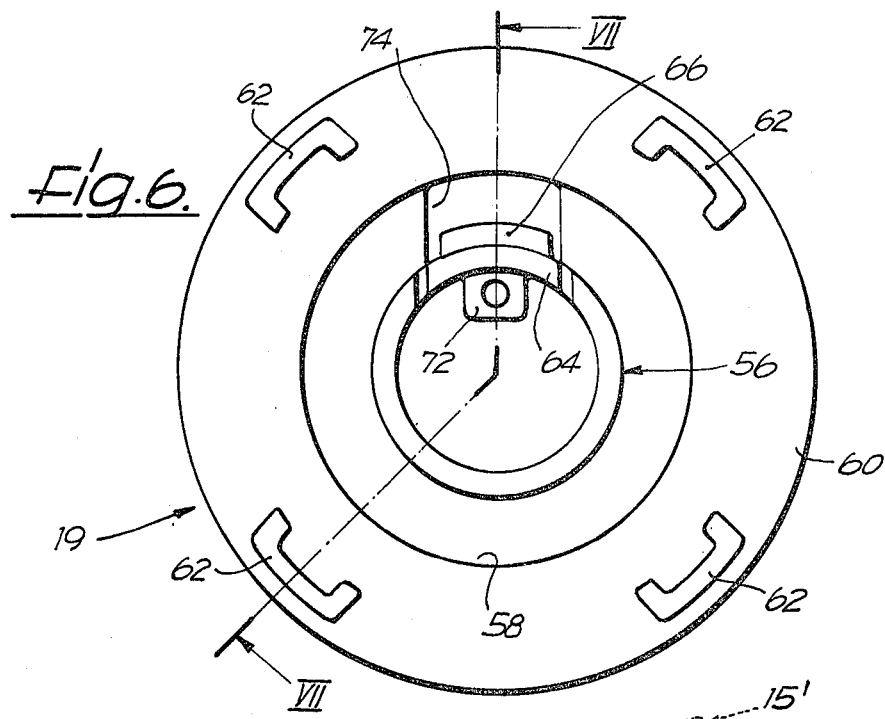
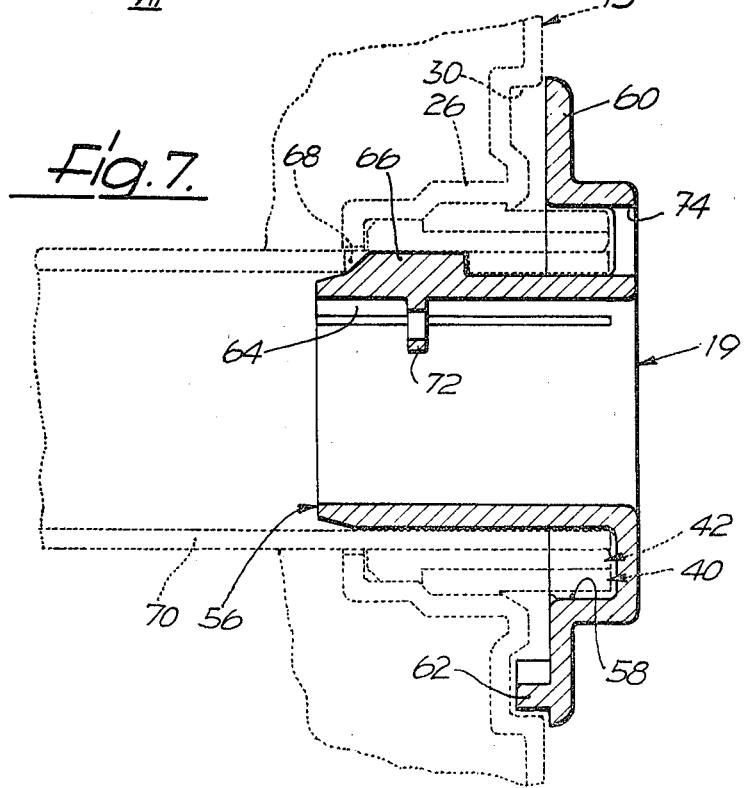

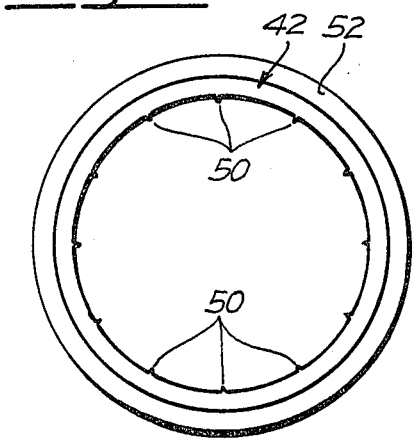
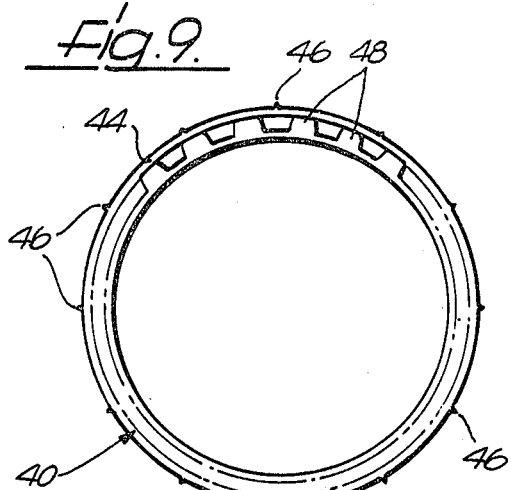
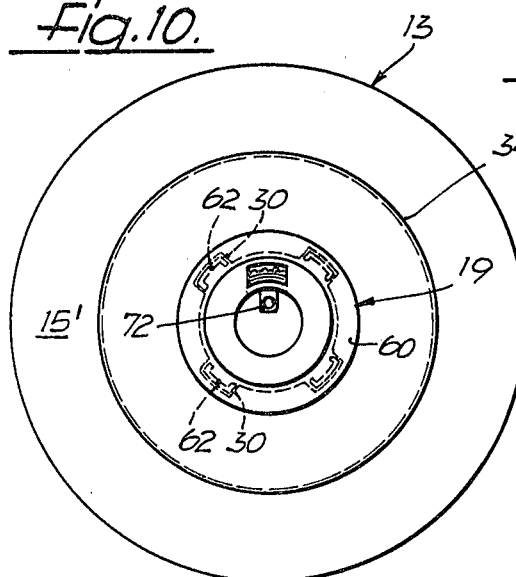
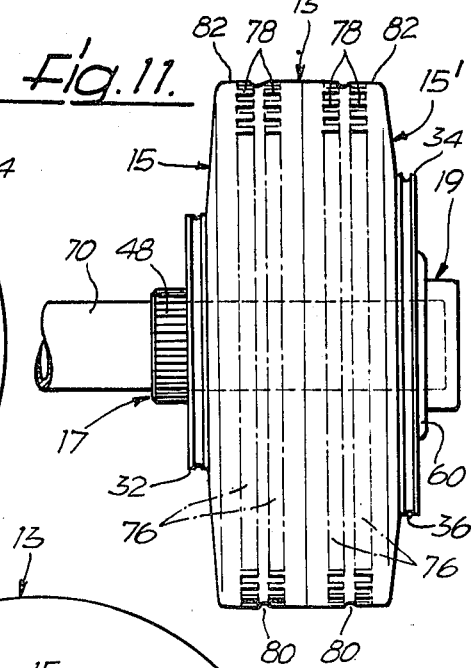
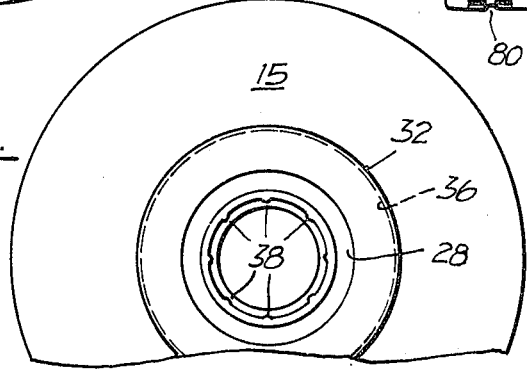

MULTI-PURPOSE WHEEL PARTICULARLY USEFUL FOR GAMES AND DEMONSTRATIONS

The object of the present invention is to create a multi-purpose wheel, particularly useful for games and demonstrations, which has at least one rim with a hub for operative connection to a drive shaft or wheel axle, a rolling tread, and a freewheel, the wheel being suitable for diversified use.

In accordance with the invention, each hub is provided with a radially outer wheel bush which is fixed axially on and secured fixedly in rotation with an associated rim and is provided with an axle bush which is fixed axially, but freely rotatable within the wheel bush, and which is adapted for force-lock connection to the axle or shaft. On the outer side of one rim there is provided one-half of an axially assemblable claw coupling, and on the associated hub cap there is provided the other coupling half, the hub cap being form-lock connected to the axle.

This construction of a wheel in accordance with the invention, which consists of only four parts, one of which is the hub cap and two of which form the hub, has the particular advantage that by reversing the wheel either the claw coupling or the freewheel can be placed into action, as desired.

A light, easily manufactured wheel in accordance with the invention is characterized by the fact that the tread is formed on two rims and the two rims together with the tread form a single hollow body of plastic material. In this case, each rim may be provided with a hub of its own or the two rims may be provided with a common hub.

In a preferred embodiment of the wheel of the invention which is provided with two rims, each of the two bushes of each hub has an axially inner, radially outward extending collar; the collar of the wheel bush engages by means of its axially inner end surface in form-locked and force-locked manner behind radially inward projecting elastically deformable noses of the associated rim; and the collar of the axle bush is mounted for free rotation in an annular space formed by said rim and the wheel bush. In this way the result is advantageously obtained that the bipartite hub is simple to manufacture and can be arranged on the associated wheel rim in such a manner that no special support is required for the rotatable axle bush.

In the preferred embodiment, the radially inner side of the axle bush and the radially outer side of the collar of the wheel bush are each provided with paraxial knife edges which act on the axle or shaft and on the associated rim, respectively.

These linear, lengthwise knife edges, depending on their sharpness, have a trapezoidal to triangular cross section which makes it possible for them so to fasten the two rim parts by incision that the axle bush is supported on the axle or torque-free shaft and the wheel bush is mounted at least secured for rotation on the rim. The incisions into the axle or shaft and into the rim also has a favorable effect on the securing of axial position.

Since in the preferred embodiment, the axially outer end of the wheel bush extends out of the rim and has a radially outer gear rim, the wheel can be driven with stepdown transmission by a toothed belt which cooperates with the gear rim.

In the preferred embodiment, the one coupling half has at least one pair of diametrically opposite axial elevations or depressions of the rim which cooperate with complementary depressions and elevations, respectively, on the axially inner side of a flange of the hub cap which forms the other coupling half. This simple construction of the coupling is entirely sufficient to permit the coupling to be transmissive in the two opposite directions of rotation. The wheel of the invention therefore can be used for forward travel and reverse travel.

In the preferred embodiment there are specially provided coupling depressions on the rim and claw-like elevations on the hub cap, the other rim having an axially open annular groove for the idling engagement of the elevations on the flange of the hub cap so that the coupling can be eliminated by turning the wheel around.

The preferred embodiment includes a hollow drive shaft having a side wall opening, for which the hub cap is provided with a coaxial socket with a paraxial tongue whose free end is provided with a radially outward projection for close fitting engagement into such side wall opening. The hub cap can therefore be connected with the hollow shaft in simple manner by by rotating its socket within the end of the hollow shaft until the projection on the socket tongue engages in the shaft opening.

Since in the preferred embodiment each rim has at least one annular step within the radially outer periphery of which a round groove is formed for the engagement of an O-drive belt, the wheel of the invention can be used as a transmission element. In this case it is advisable, as in the preferred embodiment, for the two rims to have steps of different diameter so that a stepup or stepdown transmission can be effected by means of the wheel.

The preferred embodiment is characterized furthermore by the fact that the tread has at least one toothed ring formed therein for the engagement of a toothed belt so that the extreme ratio of the diameter of the tread to that of the wheel bush can be utilized for purposes of transmission. In this connection the toothed ring in the tread does not interfere at all with the rolling of the wheel since the radial outer surfaces of the teeth of the toothed ring lie in the travel surface of the tread.

Finally, in the preferred embodiment, it is provided that the tread have along the toothed ring, for engagement with a drive belt, an annular groove formed therein which interrupts the teeth of said ring so that a toothed belt or, for instance, an O-drive belt can be used, as desired.

The invention will be described below with reference to the preferred embodiment of the wheel of the invention shown by way of example in the drawings, in which:

FIG. 1 is a side view of a wheel according to the present invention without hub cap;

FIG. 2 is another side view of the wheel shown in FIG. 1 viewed from the side opposite to that shown in FIG. 1 partially broken away and in section and shown without a hub cap.

FIG. 3 is a partial schematic front view of the wheel shown in FIG. 1 and FIG. 2 without a hub cap;

FIG. 4 is an exploded view of one half of the wheel shown in FIG. 3 without a hub cap;

FIG. 6 is a rear view of the hub cap for the wheel shown in FIG. 3;

FIG. 7 is an partial angular cross section taken along the line VII—VII in FIG. 6;

FIG. 8 is a front view of a axle bush of a hub of the wheel;

FIG. 9 is a partial diagrammatic front view of the wheel bush of a hub of the wheel;

FIG. 10 is a side view of a wheel with a hub cap according to the present invention;

FIG. 11 is a partial schematic front view of a wheel with a hub cap mounted on an axle according to the present invention; and FIG. 12 is a fragmentary side view of the rim shown in FIG. 2.

Figure 5:
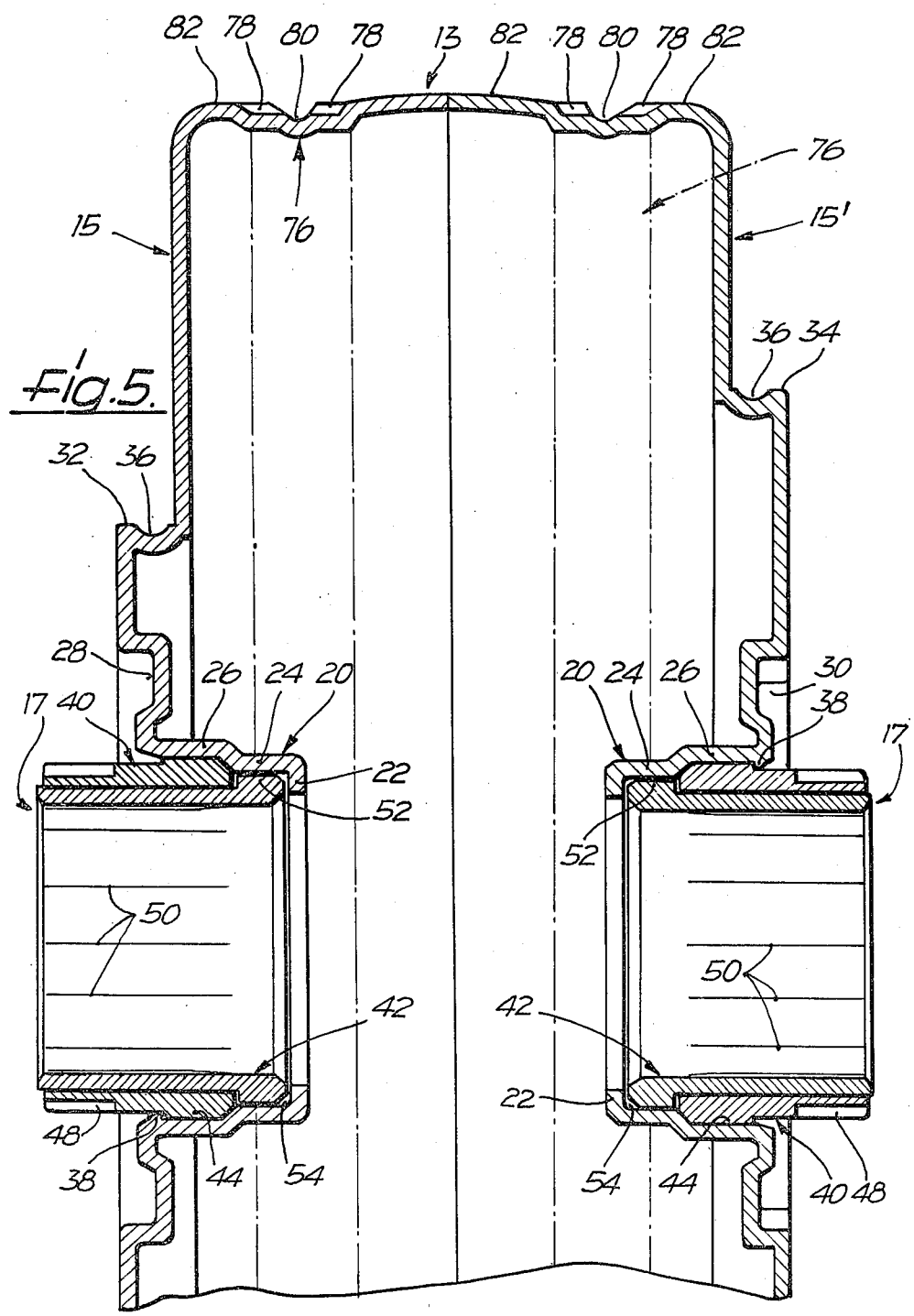
FIG. 5 is a partial central longitudinal section taken along the line V—V in FIG. 1.

The multipurpose wheel consists primarily of a tread 13, two rims 15, two hubs 17 as well as a hub cap 19 and is shown in combination with an axle or shaft. One end of the axle or shaft bears the two coaxial hubs 17 which are arranged in the centers of the two parallel rims 15 between the outer edges of which the tread 13 is located. The tread 13 and the two rims 15 form a single hollow body of plastic material. The two hubs 17 and the hub cap 19 placed on one of them consist also of plastic material, of which these wheel parts may be formed in two pieces and in one piece, respectively.

Each of the two rims 15, which are generally of similar form and are arranged symmetrically with respect to a central plane, is a circular disk, profiled in the manner shown in FIG. 5, of approximately constant wall thickness with a central pro-hub 20 to receive one of the actual hubs 17. The pro-hub 20 is provided at its axially inner end with an inner collar 22 and is so bent at an angle at its center as to produce an axially inner section 24 which bears the inner collar 22 and an axially outer section 26 which is of larger diameter.

Radially outwards of the section 26 of the pro-hub 20 of the left-hand rim 15 in FIG. 5 and formed on the axially outer end thereof there is, formed therein, an annular groove 28 of constant depth and width which is open axially outward and cooperates, in a manner still to be described, with the hub cap 19 to form a freewheel for the wheel. On the other rim 15', to the right in FIG.5, instead of the annular groove 28 there are formed merely two perpendicular pairs of rectangular depressions 30 which are diametrically opposite each other, the depressions 30 representing one-half of an axially assemblable claw coupling of rim and hub cap which acts free of slippage in both directions of rotation of the wheel.

Each of the two rims 15 and 15' is provided with an annular step 32 and 34, respectively, having different profiles, in whose radially outer periphery, extending around the annular groove 28 and the four depressions 30 which are arranged along a circular line, there is form an annular rounded groove 36 for the engagement of an O-drive belt. The annular groove 36 on one rim 15' having a larger diameter than the annular groove 36 of the other rim 15.

At the axially outer end of the section 26 of each pro-hub 20 there is a row of radially inwardly protruding elastically deformable noses 38 distributed uniformly about the circumference of said end, the function of which noses will become clear in connection with the hubs 17.

Each of the two hubs 17, which are identical to each other, consists of a radially outer wheel bush 40 which is fixedly in rotation with its associated rim 15, and of an axially fixed axle bush 42 which travels freely within said wheel. The axle bush 42 can be connected in either a form-locked or force-locked manner with the axle or shaft.

The wheel bush 40 is provided at its axially inner end with an outer collar 44 having paraxial outer knife edges 46 and at its axially outer end extending out of the rim 15 with a radially outer gear rim 48. The outer collar 44 presses against the pro-hub 20 by means of its knife edges 46 piercing into the pro-hub section 26 and by engagement of its axially outer end with the rim noses 38, thereby being positioned in a force-lock and form-lock manner.

The axle bush 42 is provided on its radial inner side also with paraxial knife edges 50 which pierce into the axle or shaft bearing the wheel. The axle bush 42 is further provided at its axially inner end an outer collar 52 which is supported for free rotation in an annular space 54 which is formed by the inner collar 22 of the pro-hub 20, section 24 of the pro-hub 20 and the axially inner end of the wheel bush 40.

There is a slide fit between the wheel bush 40 and the axle bush 42 of the hubs 17.

The hub cap 19, only one of which is present, has a circular cylindrical socket 56 like the hub 17, an annular space 58 surrounding the axial outer end of said socket and limited radially inwards by same, adapted to receive the end extending out of the rim 15 of the right-hand hub 17 in FIG. 5, as well as a concentric flange 60 which is provided on its axially inner side with four U-shaped bosses. The bosses 62 comprise driving means forming the other claw coupling half and so axially engage in form-locked fashion with the depressions 30 associated in the right-hand rim 15' in FIG. 5 that the hub cap 19 can act on the rim 15' in both rotational directions. For the freewheeling of the wheel, the wheel is reversed and the hub cap 19 is placed on the end extending out of the rim 15 of the left-hand hub 17 in FIG. 5, the bosses 62 on the flange 60 engaging without action into the annular groove 28 of said rim so that the wheel can turn even with the hub cap stationary, independently of an axle bearing it.

The hub cap socket 56 has a paraxially cut tongue 64 whose axially inner free end is provided radially on the outside with a projection 66 for engagement, with proper fit, into an opening 68 in a hollow shaft 70 which drives the wheel. The engagement of the projection 66 into the shaft opening 68 occurs automatically upon the insertion of the socket 56 into the hollow shaft 70. For disengagement, the tongue 64 bears on its radially inner side a lug 72 which is opposite the projection 66 and which can be reached through the cavity of the socket 56 by means of a hook or other tool. In order to make the base of the tongue 64 more flexible, the hub cap 19 has a window opening 74 through which the projection 66 is visible.

The tread 13 is provided on its radially outer side with two toothed rings 76 developed therein for the engagement of one or two toothed belts. Each toothed ring 76 is provided with a centrally formed annular groove 80 for the engagement of a drive belt, the groove interrupting the teeth 78 of said ring. The radially outer surface of the teeth 78 lies in the travel surface 82 of the tread 13.

Although particular embodiments of the present invention have been described and illustrated herein, it should be recognized that modifications and variations may readily occur to those skilled in the art and that such modifications and variations may be made without departing from the spirit and scope of my invention.

Accordingly, all such modifications and variations are included in the scope of the invention as defined by the following claims.

I claim:

1. A wheel comprising a tread, at least a rim provided on an outer side thereof with one half of an axially assemblable claw coupling, a wheel hub including a wheel bushing fixed axially with respect to the rim and fixed for rotation with the rim and including an axle bushing positioned generally within the wheel bushing and fixed axially with respect to the rim and rotatable in a free running manner with respect to the rim, and a hub cap provided with the other half of the axially assemblable claw coupling for axial attachment to said rim and adapted to be connected for rotation with said wheel axle such that rotation of said wheel axle causes rotation of said hub cap and rotation of said hub cap causes rotation of said rim, and wherein said rim is provided on another side with an axially open, continuous annular groove adapted to be positioned for reception of bosses of said other half of the axially assemblable claw coupling.

2. A multi-purpose wheel rotatable on a wheel axle comprising at least one rim with a peripheral rolling tread, a wheel bushing fixed to the rim for rotation with the rim, an axle bushing rotatable within the wheel bushing with respect to the rim and having a portion axially disposed between the rim and the axle bushing to axially fix the position of said axle bushing in said rim, said axle bushing including means for affixing said axle bushing to said wheel axle, a hub cap for covering portions of said wheel axle, said wheel bushing, said axle bushing and said rim, means on said hub cap and said wheel axle for affixing said hub cap to said wheel axle such that said hub cap rotates with said wheel axle, and coupling means on said hub cap and one side of said rim for permitting rotation of said hub cap to cause rotation of said rim, and wherein said rim is provided on another side with an axially open, continuous annular groove adapted to be positioned for reception of said coupling means on said hub cap.

3. The wheel according to claim 2, wherein
the coupling means includes a plurality of projections on one of said hub cap and said rim engageable in a corresponding plurality depressions in the other of said hub cap and said rim.

4. The wheel according to claim 3, wherein
said hub cap is provided with said projections and said rim is provided with said depressions.

5. The wheel according to claim 2, further comprising
two of said rims forming a single rolling body and two of said hub caps and wherein the other of said rims is provided with a clearance space for reception of the coupling means of the other said hub cap, such that the other said hub cap is rotatable freely of said rolling body when rotation of said wheel axle causes rotation of said other hub cap.

6. A multi-purpose wheel particularly useful for games and demonstrations comprising at least one rim, a rolling tread, a wheel hub, a hub cap and wherein said hub includes a wheel bushing which is fixed axially with respect to the rim and fixed for rotation with the rim and further includes an axle bushing positioned generally within the wheel bushing and fixed axially with respect to the rim and rotatable in a free running manner with respect to the rim and adapted to be connected in a force-locked manner to a wheel axle, wherein said rim is provided on an outer side with one half of an axially assemblable claw coupling, and said hub cap is provided with the other half of the axially assemblable claw coupling for axial attachment to said rim and said hub cap is adapted to be connected in a form-locked manner with said wheel axle such that rotation of said wheel axle causes rotation of said hub cap and rotation of said hub cap causes rotation of said rim, and wherein said at least one rim is provided on another side with an axially open, continuous annular groove adapted to be positioned for reception of bosses of said other half of the axially assemblable claw coupling of freewheeling.

7. A wheel according to claim 6 wherein the axially outer end of the wheel bushing is provided with a toothed or serrated outer surface.

8. A wheel according to claim 6 wherein said other half of the axially assemblable claw coupling includes a series of axial claw shaped said bosses and said one half of the coupling includes a corresponding series of depressions for cooperating reception of the bosses.

9. A wheel according to claim 6 wherein said axle is hollow and has a sidewall opening and said hub cap is provided with a coaxial socket having a paraxial tongue, the free end of which is provided with a radially outward projection for cooperative extension into the side wall opening of the hollow axle.

10. A wheel according to claim 6 wherein said rim is provided with at least one annular step, the outer periphery of which is grooved for the engagement of a driving belt.

11. A wheel according to claim 6 wherein said rim is provided with radially inward projecting elastically deformable noses, wherein said axle bushing is provided at its axially inner end with a radially outward extending collar positioned such that there is an axial annular gap between the collar and said noses, and wherein said wheel bushing is provided at its axially inner end with a radially outward extending collar positioned in the axial annular gap between the axle bushing collar and said noses in a force-locked and form-locked manner.

12. A wheel according to claim 11 wherein the axle bushing collar is provided with paraxial knife edges for engaging said wheel axle and wherein the wheel bushing collar is provided with paraxial knife edges for engaging said rim.

13. A wheel according to claim 6 wherein said tread comprises at least one toothed ring adapted for engagement by a toothed belt.

14. A wheel according to claim 13 wherein said tread is further provided with an annular groove interrupting the teeth of the toothed ring.

15. A wheel according to claim 6 comprising two said rims forming a single hollow body having the rolling tread thereon.

16. A wheel according to claim 15 wherein said other half of the axially assemblable claw coupling comprises an annular series of axial claw shaped said bosses, wherein one of said rims is provided with said one half of the axially assemblable claw coupling comprising an annular series of depressions for cooperating reception of the bosses, and wherein the other of said rims is provided with said axially open, continuous annular groove for reception of the bosses.

17. A wheel according to claim 15 wherein each rim is provided with at least one annular step, the outer periphery of which is grooved for the engagement of a driving belt, the diameters of the steps of each rim being different.

* * * * *